United States Patent
Park et al.

(10) Patent No.: US 12,443,197 B2
(45) Date of Patent: Oct. 14, 2025

(54) PROGRAMMABLE LOGIC CONTROLLER OPERATION SYSTEM AND METHOD FOR EACH MOVEMENT POSITION OF LOGISTICS ROBOT

(71) Applicants: HYUNDAI MOTOR COMPANY, Seoul (KR); Kia Corporation, Seoul (KR)

(72) Inventors: Kyung Dong Park, Hwaseong-si (KR); Sang Won Yoon, Suwon-si (KR); Youngjin Jung, Cheonan-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 882 days.

(21) Appl. No.: 17/672,127

(22) Filed: Feb. 15, 2022

(65) Prior Publication Data

US 2023/0071269 A1   Mar. 9, 2023

(30) Foreign Application Priority Data

Sep. 6, 2021   (KR) .................. 10-2021-0118632

(51) Int. Cl.
 G05D 1/02 (2020.01)
 B25J 9/16 (2006.01)
 (Continued)

(52) U.S. Cl.
 CPC .......... G05D 1/0274 (2013.01); B25J 9/1674 (2013.01); G05B 19/4155 (2013.01);
 (Continued)

(58) Field of Classification Search
 CPC .. G05D 1/0212; G05D 1/0274; G05D 1/0272; B25J 9/1674; G05B 19/4155
 See application file for complete search history.

(56) References Cited

U.S. PATENT DOCUMENTS 11,878,422 B2 *   1/2024  Oyekanlu ......... G05B 19/41895
12,111,632 B1 *  10/2024  Bansal ............... G05B 19/4155
(Continued)

FOREIGN PATENT DOCUMENTS

CN      110301223 A   * 10/2019  ............. A01D 46/00
CN      111558926 A   *  8/2020  ................ B25J 9/12
(Continued)

OTHER PUBLICATIONS

An English-translated version of reference KR 20180093155 A (Aug. 21, 2018) by Lee et al. (Year: 2024).*
(Continued)

*Primary Examiner* — Cuong H Nguyen
(74) *Attorney, Agent, or Firm* — MORGAN, LEWIS & BOCKIUS LLP

(57) ABSTRACT

Disclosed is a system for operating a Programmable Logic Controller (PLC) for each movement position of a logistics robot, and a method thereof. A system for operating a PLC for each movement position of a logistics robot according to an exemplary embodiment of the present disclosure includes: a logistics robot configured to supply a necessary component for each process at an industrial site; a PLC which is installed in each process and controls one or more connected equipment; and a server which allocates a transport path of a component to the logistics robot, controls an interworking operation of the equipment based on a movement position of the logistics robot through an input of a PLC memory value of the PLC, traces a control history of each equipment, and recognizes whether the equipment is normally operated and the input of the PLC memory value is omitted.

17 Claims, 7 Drawing Sheets

(51) Int. Cl.
   *G05B 19/4155*   (2006.01)
   *G05D 1/00*   (2006.01)
(52) U.S. Cl.
   CPC . *G05D 1/0272* (2013.01); *G05B 2219/50391* (2013.01); *G05D 1/0022* (2013.01)

(56) References Cited

U.S. PATENT DOCUMENTS

| | | | | |
|---|---|---|---|---|
| 12,187,155 | B2* | 1/2025 | Kayaarasi | ................. H02J 7/35 |
| 2017/0052518 | A1* | 2/2017 | Wang | ................. G05B 19/4183 |
| 2022/0332211 | A1* | 10/2022 | Kayaarasi | ................ B60K 1/04 |

FOREIGN PATENT DOCUMENTS

| | | | | | |
|---|---|---|---|---|---|
| CN | 110301223 | B | * | 8/2023 | ............ A01G 9/023 |
| EP | 3114017 | B1 | * | 1/2021 | ........... B62D 65/022 |
| JP | 2021523498 | A | * | 9/2021 | ....... G06Q 10/06315 |
| JP | 7113560 | B2 | * | 8/2022 | ............... G06F 3/14 |
| KR | 10-2017-0111207 | A | | 10/2017 | |
| KR | 10-1823406 | B1 | | 1/2018 | |
| KR | 20180093155 | A | * | 8/2018 | |
| KR | 10-2082178 | B1 | | 2/2020 | |
| WO | WO-2020125839 | A1 | * | 6/2020 | ............. G06F 21/31 |

OTHER PUBLICATIONS

Wang et al., Innovative control of assembly systems and lines (Year: 2017).*
Hercik, Radim, et al. "Implementation of autonomous mobile robot in smartfactory." Applied Sciences 12.17 : 8912. (Year: 2022).*
Fadzli, Muhamad Aiman Fikri Mohd, and Sophan Wahyudi Bin Nawawi. "Automated storage and retrieval system for warehouse." Elektrika—Journal of Electrical Engineering 23.1: 88-95. (Year: 2024).*
Komáromi, Balázs, and Szabolcs Szentesi. "Possibilities of using driverless handling robots in intralogistics." Advanced Logistic Systems-Theory and Practice 18.1: 62-74. (Year: 2024).*
Pettit, Stephen, Yingli Wang, and Anthony Beresford. an abstract of "The impact of digitalization on contemporary and future logistics." The Digital Supply Chain. Elsevier, 111-125. (Year: 2022).*

* cited by examiner

FIG. 4

| ROOF AMR 125 | | | | | | | | | |
|---|---|---|---|---|---|---|---|---|---|
| Node | M | TargetRI | Output | Actio | Pri | Ru | Comp | RunTim | EndTim |
| 1641 | amr | | AMR 1 | Littd... | -1 | ✔ | ✔ | 10:34:48 | 10:34:48 |
| 1641 | amr | | AMR 1 | Start | 0 | ✔ | ✔ | 10:34:52 | 10:34:52 |

| InputMem | SensorNa | SensorRID | SensorVal | OP | Resul | Message |
|---|---|---|---|---|---|---|
| Sensor | STOCK #... | R11020.A | False | or | ✔ | [N] STOC... |
| Sensor | STOCK #... | R11020.B | False | or | ✔ | [Y] STOC... |
| Sensor | STOCK #... | R11020.C | False | and | ✔ | [Y] STOC... |
| Sensor | ROOF PL.. | R13004.A | True | and | ✔ | [Y] ROOF... |
| Sensor | ROOF PL.. | R13004.C | True | and | ✔ | [Y] ROOF... |
| Sensor | ROOF PL.. | R13004.E | True | and | ✔ | [Y] ROOF... |
| Sensor | ROOF PL.. | R13004.F | True | and | ✔ | [Y] ROOF... |
| Sensor | ROOF PL.. | R13005.0 | True | and | ✔ | [Y] ROOF... |
| Sensor | ROOF PL.. | R13005.4 | True | and | ✔ | [Y] ROOF... |
| Sensor | ROOF PL.. | R13005.8 | False | and | ✔ | [Y] ROOF... |
| Sensor | ROOF PL.. | R13005.A | False | and | ✔ | [Y] ROOF... |
| Sensor | ROOF PL.. | R13005.9 | True | and | ✔ | [Y] ROOF... |
| Sensor | ROOF PL.. | R13004.9 | True | and | ✔ | [Y] ROOF... |

| Node | M | TargetRI | Output | Actio | Pri | Ru | Comp | RunTim | EndTim |
|---|---|---|---|---|---|---|---|---|---|
| 1641 | plc | R13001... | AGV ROOF PLT... | False | 9 | ✔ | ✔ | 10:34:52 | 10:34:52 |

BUILD AGV 137

| Node | Mod | TargetRI | Output | Actio | Prior | Ru | Comp | RunTim | EndTim |
|---|---|---|---|---|---|---|---|---|---|
| 401 | amr | | AMR 2 | Lift... | -1 | ✔ | ✔ | 10:38:28 | 10:38:28 |
| 401 | amr | | AMR 2 | Start | 0 | ✔ | ✔ | 10:38:32 | 10:38:32 |

| InputMem | SensorNa | SensorRID | SensorValu | OP | Resul | Message |
|---|---|---|---|---|---|---|
| Sensor | BB PLT1... | R13012.C | True | and | ✔ | BB PLT... |
| Sensor | BB PLT1 L... | R13012.E | True | and | ✔ | BB PLT... |
| Sensor | BB PLT2... | R13013.6 | True | and | ✔ | BB PLT... |
| Sensor | BB PLT2 L... | R13013.8 | True | and | ✔ | BB PLT... |
| Sensor | BB PLT3... | R13014.0 | True | and | ✔ | BB PLT... |
| Sensor | BB PLT3 L... | R13014.2 | True | and | ✔ | BB PLT... |

| Node | Mod | TargetR | Output | Actio | Prior | Ru | Comp | RunTim | EndTim |
|---|---|---|---|---|---|---|---|---|---|
| 401 | plc | R1300.. | AMR BB PLT1 NO... | Fale | 1 | ✔ | ✔ | 10:38:33 | 10:38:33 |
| 403 | plc | R1300.. | AMR BB PLT1 NO... | True | 0 | ✔ | ✔ | 10:38:42 | 10:38:42 |
| 403 | plc | R1300.. | AMR BB PLT1 IN... | Fale | 0 | ✔ | ✔ | 10:38:42 | 10:38:42 |

Inquiry AMR operation state history for each cell (rack)

Access DB information: 10.20.193.12  DB name: ACMUL_DB  Type of target DB: ACMUL_DB
ID: administrator  P/W: admin1
[Call reference DB] [Store Reference DB]

Interval time of interlock request: 2s  Number of times of reattempt when interlock fails: Three times  Inquiry reference: 10 non-performance items  ☑ Automatic inquiry  Real-time inquiry

| No | Inquiry table name | Type of PLC | *Explanation | Memory address | Request valu | Current value | Operation result | Operation | Operation date |
|---|---|---|---|---|---|---|---|---|---|
| 1 | PLC_INFO | Melsec | Interlock for ㈀ | R11021.1 | True | True | Complete | ▲ Manual attempt | 2020-10-27 14:22:12 |
| 2 | PLC_INFO | Melsec | Interlock for ㈀ | R11021.1 | True | True | Complete | ▲ Manual attempt | 2020-10-27 14:22:22 |
| 3 | PLC_INFO | Melsec | Interlock for ㈀ | R11021.1 | True | True | Complete | ▲ Manual attempt | 2020-10-27 14:22:42 |
| 4 | PLC_INFO | Melsec | Interlock for ㈀ | R11021.1 | True | False | Fail | ▲ Manual attempt | 2020-10-28 16:41:14 |
| 5 | PLC_INFO | Melsec | Interlock for ㈀ | R11021.1 | True | True | Complete | ▲ Manual attempt | 2020-10-28 16:32:32 |
| 6 | PLC_INFO | Melsec | Interlock for ㈀ | R11021.1 | True | True | Complete | ▲ Manual attempt | 2020-10-29 17:47:38 |
| ... | ... | ... | ... | ... | ... | ... | ... | ... | ... |

Current connection
PLC information: Melsec
IP information: 10.20.197.11 ▶
Port: 8888 ▶

※Control progress state
| Connect state | DB loading | Application step |

| PLC connection state: Normal | DB connection state: Normal | | Error history: No |

※Control PLC interlock operation based on list stored in interlock table
The purpose of PLC scheduler is to execute logic normally/sequentially based on interlock table ※Operate based on information in which PLC communication protocol for each process is set

PROGRAMMABLE LOGIC CONTROLLER OPERATION SYSTEM AND METHOD FOR EACH MOVEMENT POSITION OF LOGISTICS ROBOT

CROSS-REFERENCE TO RELATED APPLICATION

This application claims priority to and the benefit of Korean Patent Application No. 10-2021-0118632 filed in the Korean Intellectual Property Office on Sep. 6, 2021, the entire contents of which are incorporated herein by reference.

TECHNICAL FIELD

The present disclosure relates to a Programmable Logic Controller (PLC) operation system for each movement position of a logistics robot that transports components in an industrial site, and a method thereof.

BACKGROUND

In general, a logistic robot (autonomous mobile robot (AMR)) detects surroundings through a sensor, moves to a destination by itself, and is optimized for picking, so that the AMR is applied to transport logistics in industrial sites.

For example, recently, in a smart factory-based vehicle manufacturing plant, components of various parts are assembled by modulating the automation process, and a logistics robot is operated for flexibly transporting the components for each process. In the automated process, interruption of the supply of the components during the operation causes line stoppages and adversely affects yield, so that it is very important to transport the component in the right place at the right time through the smooth operation of the logistics robot.

In the meantime, in the transport path of the components, a plurality of nodes that the logistics robot must pass through, including a departure point and a destination, are sequentially set. Further, a programmable logic controller (PLC) installed in each node controls an interlock operation between corresponding peripheral equipment and the AMR according to a set PLC memory value.

For example, the logistics robot may be linked with transport devices that load components in or unload components from a component warehouse that is a departure point and a process line that is a destination, and equipment along the transport path, such as an automatic door, an elevator, and an intersection.

However, in the related art, when the logistics robot is introduced, due to the absence of PLC operation technology that satisfies the operating conditions for interworking with various peripheral equipment for each process, there is a problem in that an interruption event occurs frequently due to interference and collision with the peripheral equipment during the actual operation of the logistics robot.

Further, in the related art, when the interruption event of the logistics robot occurs, an operator does not know the interruption event immediately, or even if the operator recognizes the interruption event, it is difficult to determine the cause of the interruption event.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a Programmable Logic Controller (PLC) operating system for each movement position of a logistics robot which manages a PLC memory value for each movement position of a logistics robot applied to an industrial site according to a control history trace to control a smooth operation for interworking between corresponding peripheral equipment and the logistic robot, and a method thereof.

An exemplary embodiment of the present disclosure provides a system for operating a Programmable Logic Controller (PLC) for each movement position of a logistics robot, the system including: a logistics robot configured to supply a necessary component for each process at an industrial site; a PLC which is installed in each process and controls one or more connected equipment; and a server which allocates a transport path of a component to the logistics robot, controls an interworking operation of the equipment based on a movement position of the logistics robot through an input of a PLC memory value of the PLC, traces a control history of each equipment, and recognizes whether the equipment is normally operated and the input of the PLC memory value is omitted.

Further, as the logistics robot, at least one of an autonomous mobile robot (AMR) and an automated guided vehicle (AGV) may be applied.

Further, the logistics robot may include: a communication module which measures a current movement position and transmits the measured current movement position to the server, and transceives state information for interworking with a PLC existing in a current travelling section; and a driving module which stores a factory map and a coordinate system for each set node, and controls a movement of the logistics robot based on the transport path.

Further, the PLC may include an equipment control module which recognizes an operation state of the equipment and a movement position and state information of the logistics robot, and controls the interworking operation of the equipment satisfying a control condition set in the PLC memory.

Further, the equipment control module may perform interlock control that temporarily interrupts operating equipment for safety when the logistics robot enters.

Further, the server may include: a PLC communication unit which is connected with the PLC and controls an operation of the equipment for each process and collects state information of the controlled equipment; a logistic robot communication unit which establishes wireless communication with the logistics robot, and transmits a transport path of the component to the logistics robot and collects a real-time movement position of the logistics robot; a controller which designates a PLC memory value of a PLC memory address connected with equipment of the PLC within a process in which a control condition is satisfied based on a real-time movement position of the logistics robot and controls an operation of the corresponding equipment; a control history tracing unit which traces a history of real-time control actually controlled according to the control of the operation of the equipment and manages the traced control history in a database; and a control state display which displays a memory output value non-reflection error for a PLC memory value item that is not properly input according to a request for an input of the PLC memory value based on the control history.

Further, the PLC communication unit may collect a PLC memory value output from a PLC memory address of each equipment connected to the PLC in order to check the state information.

Further, the controller may check state information of equipment connected with the PLC through the PLC communication unit, and set a PLC memory value for interworking with equipment for each movement position of the logistics robot.

Further, the controller may transmit the PLC memory value to the PLC and request the input of the PLC memory value to the PLC memory address of the corresponding equipment.

Further, the control history tracing unit may trace the control history through a control history tracing screen including a result request table which requests whether the PLC memory value set for the equipment connected to the PLC for each process is normally output and a trace completion table in which whether the PLC memory value is output is received in correspondence to the result request table.

Further, the trace completion table may include a current movement position of the logistics robot, a memory address of equipment designated as a tracing target and a PLC memory value output as a control history, a result value according to checking of an output of a PLC memory value output of a current condition, a final change completion value, a PLC control start time, and a PLC control completion time.

Another exemplary embodiment of the present disclosure provides a method of operating, by a server in an industrial site, a programmable logic controller (PLC) for each movement position of a logistics robot that transports component for each process, the method including: a) initiating component transport work by allocating a transport path of a component to a logistics robot and recognizing a real-time movement position of the logistics robot from the logistics robot; b) controlling an interworking operation of at least one equipment connected to a PLC by inputting a PLC memory value to the PLC of an entry section based on the movement position of the logistics robot; c) tracing a control history of each equipment and collecting a PLC memory value output from a corresponding PLC memory address; and d) recognizing whether there is a memory output value that is not controlled according to a request for control of a PLC memory value and is omitted based on the collected control history.

Further, the operation b) may include performing interlock control for temporarily interrupting operating equipment for safety immediately before entry of the logistics robot.

Further, the operation c) may include: controlling, by the PLC, an operation of each equipment according to the input PLC memory value, collecting state information according to a result of the control, and storing the collected state information in a PLC memory; and extracting and transmitting the control history of each equipment stored in the PLC memory according to a request from the server.

Further, the operation d) may include when there is an omitted memory output value for an input of the PLC memory value, displaying and alarming the omitted PLC memory value.

Further, the method may further include, after the operation d), transmitting a PLC memory value of an item omitted in the control history to a corresponding PLC and re-updating the PLC memory value.

Further, the method may further include, before the operation a), selecting a logistics robot in consideration of the type and a size of a component when component transport work is planned, and generating a transport path from a departure point to a destination, checking a PLC and a PLC memory value according to a control condition based on the transport path and a specification of the logistics robot, and transmitting a PLC memory value according to an equipment control condition of a PLC for each movement position of the logistics robot to each PLC and setting the PLC memory value; and collecting the PLC memory value set in the PLC for each movement position after the PLC memory value is set and checking whether the PLC memory value satisfies the control condition.

Further, the checking may include when even any one among the set control conditions does not accord, outputting an alarm and resetting the corresponding PLC memory value.

According to the exemplary embodiment of the present disclosure, there is an effect of preventing in advance the risk factors that may occur depending on the operation of the actual logistics robot by checking in advance, by the server, whether the PLC control condition is satisfied in order to control the smooth operation of the peripheral interlocking equipment according to the position of the logistics robot transporting the component.

Further, there is an effect in that it is possible to rapidly change the interruption event of the AMR and the update of the PLC memory value of the reason of the interruption event by integrally controlling the equipment connected to the PLC according to the movement position of the logistics robot and recognizing whether the equipment is operated and the position of the logistics robot according to the trace of the control history of each PLC in real time.

Further, there is an effect in that it is possible to manage and analyze the operation state for each process line at the center by monitoring, by the server, the plurality of logistics robots operated in the industrial site and the operation state of the automated equipment in real time through the PLC.

BRIEF DESCRIPTION OF THE DRAWINGS

FIG. 4 is a diagram illustrating an example of a PLC control history tracing screen of a server according to the exemplary embodiment of the present disclosure.

FIG. 5 is a diagram illustrating a screen displaying a PLC interlock control state for each process according to the exemplary embodiment of the present disclosure.

DETAILED DESCRIPTION OF THE EMBODIMENTS

Figure 1:
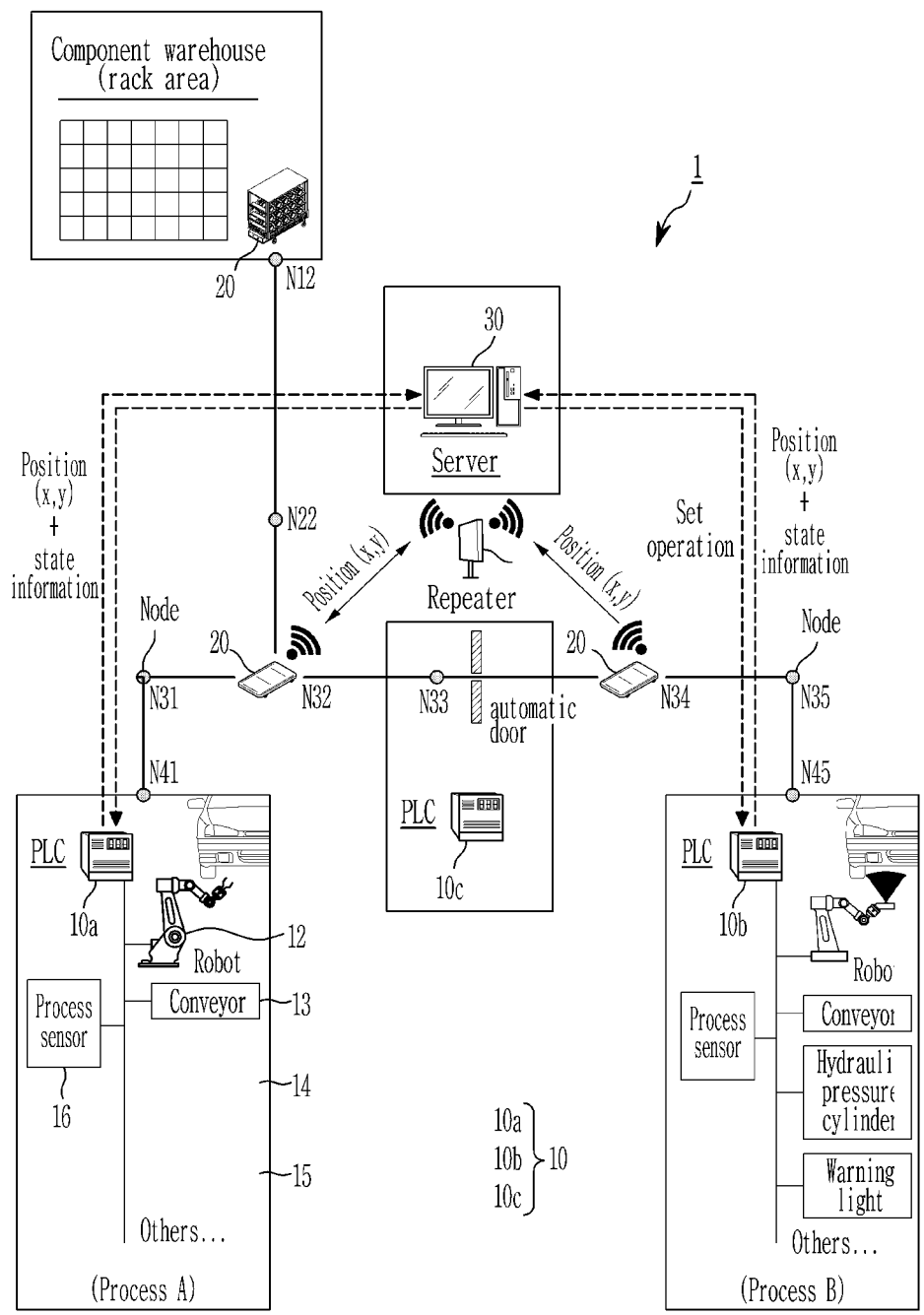
FIG. 1 is a conceptual diagram illustrating a Programmable Logic Control (PLC) operating system for each movement position of a logistics robot applied to a vehicle manufacturing factory according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification unless explicitly described to the contrary, the word "comprise", and variations such as "comprises" or "comprising", will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

Throughout the specification, in describing the constructional elements of the present disclosure, the terms of a first, a second, A, B, (a), (b), or the like, can be used, but the constituent elements shall not be limited by the terms. Such a term is only for discriminating the constructional element from another constructional element, and does not limit the essential feature.

It should be understood that when one constituent element is referred to as being "coupled to" or "connected to" another constituent element, one constituent element can be directly coupled to or connected to the other constituent element, but intervening elements may also be present. In contrast, when one constituent element is "directly coupled to" or "directly connected to" another constituent element, it should be understood that there are no intervening element present.

The term used in the present specification is simply used for describing a specific embodiment and does not intend to limit the present disclosure. A singular expression includes a plural expression unless it is specifically described to the contrary in the context.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

All terms used herein including technical or scientific terms have the same meanings as meanings which are generally understood by those skilled in the art unless they are differently defined in the present specification. Terms defined in generally used dictionary shall be construed that they have meanings matching those in the context of a related art, and shall not be construed in ideal or excessively formal meanings unless they are clearly defined in the present application.

Now, a system for operating a Programmable Logic Controller (PLC) for each movement position of a logistics robot according to an exemplary embodiment of the present disclosure and a method thereof will be described in detail with reference to the drawings.

FIG. 1 is a conceptual diagram illustrating a Programmable Logic Control (PLC) operating system for each movement position of a logistics robot applied to a vehicle manufacturing factory according to an exemplary embodiment of the present disclosure.

Figure 2:
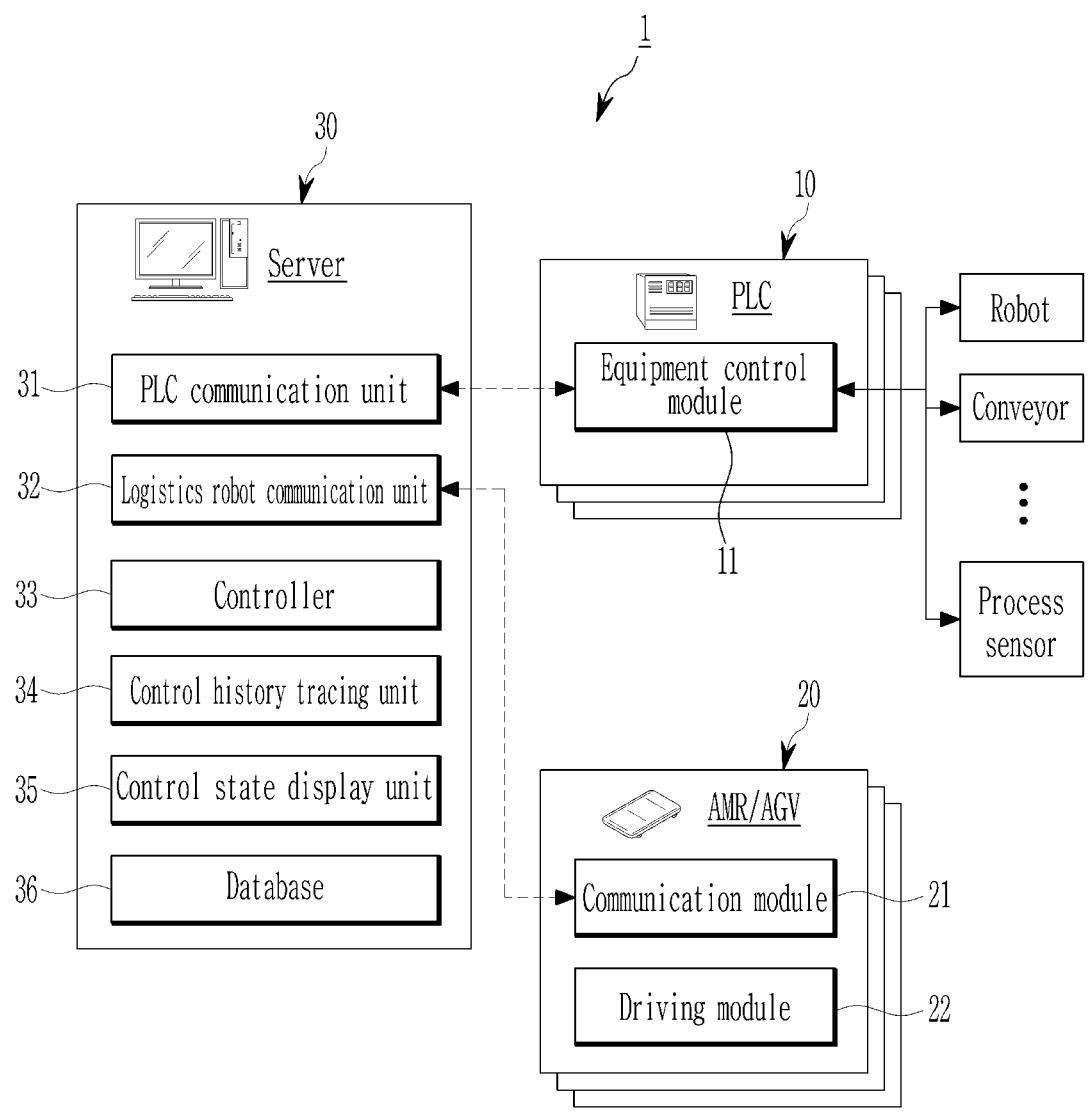
FIG. 2 is a block diagram schematically illustrating a configuration of the PLC operating system for each movement position of the logistics robot according to the exemplary embodiment of the present disclosure.

FIG. 2 is a block diagram schematically illustrating a configuration of the PLC operating system for each movement position of the logistics robot according to the exemplary embodiment of the present disclosure.

Figure 3:
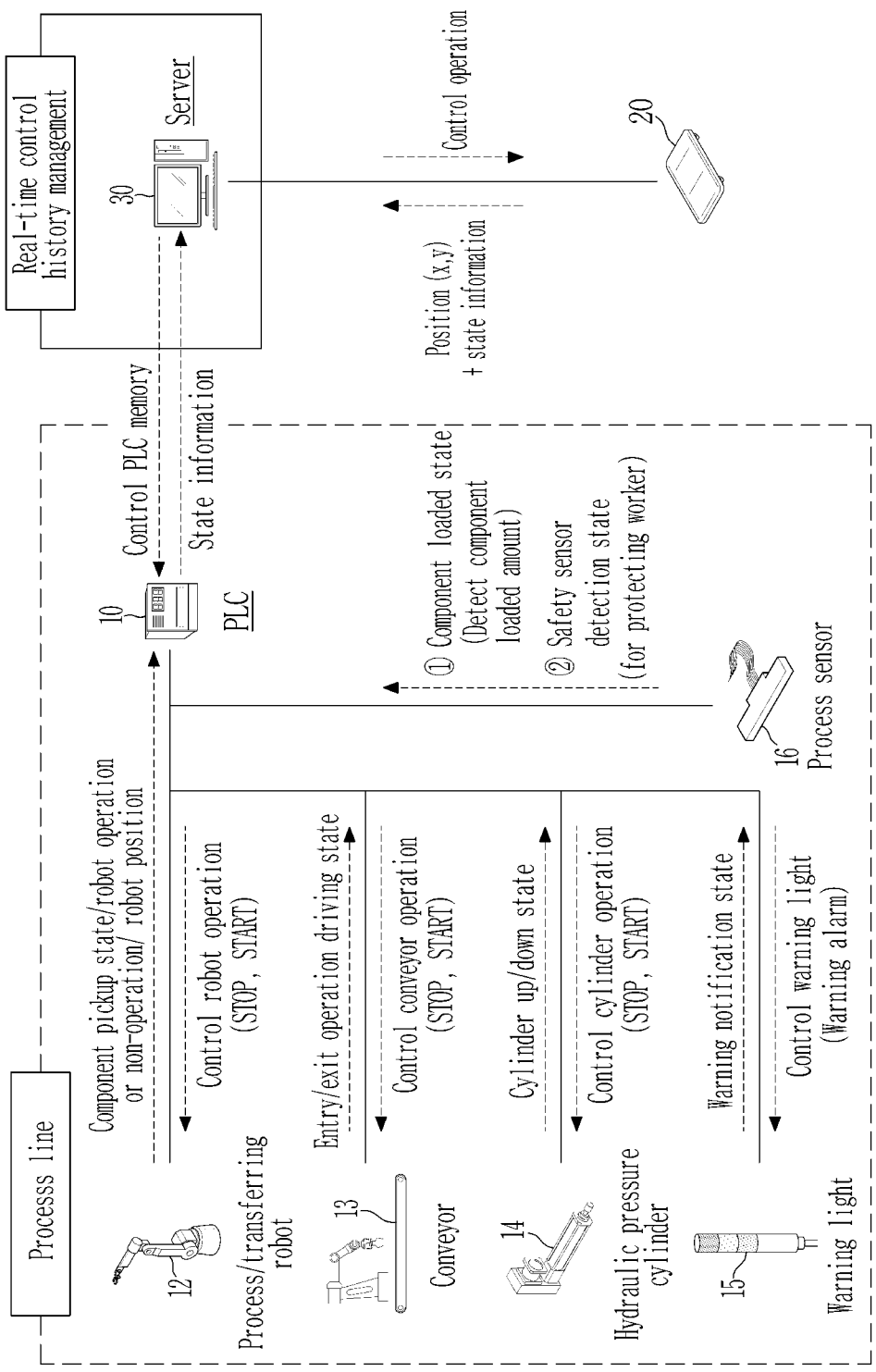
FIG. 3 is a diagram illustrating process line-based equipment control and a control history management method of the PLC operating system according to the exemplary embodiment of the present disclosure.

FIG. 3 is a diagram illustrating process line-based equipment control and a control history management method of the PLC operating system according to the exemplary embodiment of the present disclosure.

Referring to FIGS. 1 to 3, the PLC operating system 1 according to the exemplary embodiment of the present disclosure is applicable to an automated process of a vehicle manufacturing factory (smart factory).

The PLC operating system 1 for each movement position of the logistics robot includes a PLC 10 which controls automation equipment for each of various processes for assembling the components, a logistics robot 20 which supplies necessary components for each process, and a server 30 which operates the logistics robot 20 and the PLC 10 at the center.

The PLC 10 is separately installed for each process (for example, process A, process B, and process C), and includes an equipment control module 11 controlling various connected equipment according to a set PLC memory value.

The equipment for each process is set in accordance with a corresponding line characteristic, and may include, for example, a process robot 12, a conveyor 13, a hydraulic pressure cylinder 14, a warning light 15, a process sensor 16, and the like installed for process work.

The process robot 12 includes an articulated robot and a component transferring robot operated for assembling components in corresponding process work.

The conveyor 13 transports an article between the processes through a conveyor belt.

The hydraulic pressure cylinder 14 lifts up or down the component for the position change of the component.

The warning light 15 alarms a dangerous situation when an event situation occurs during the process work. For example, when the entry of an operator or the logistics robot 20 is detected during the operation of the process robot 12, the warning light 15 may make an alarm.

The process sensor 16 may include a right position recognition sensor of the logistics robot 20 for loading and unloading the component, an entry detecting sensor installed in an operation area of the process robot 12, and the like.

The equipment control module 11 controls an operation of each connected equipment under the control condition set in a PLC memory.

The equipment control module 11 recognizes an operation state of the equipment and a movement position (x, y coordinates) and state information of the logistics robot 20 and controls an interlocking operation of the equipment satisfying the control condition set in the PLC memory. Further, the equipment control module 11 may perform interlock control that temporarily interrupts the operating equipment for safety when the logistics robot 20 enters.

The equipment control module 11 controls the operations of the connected equipment according to an equipment operation setting program based on the PLC memory control, and then collects state information according to a result of the control and stores the collected state information in the PLC memory. Then, the equipment control module 11 may extract a control history of each equipment stored in the PLC memory based on the state information and transmit the extracted control history to the server 30.

Further, the PLC 10 may control the automated equipment that is installed in a stopover point (node) that the logistics robot 20 needs to pass through for transporting the component and connected, as well as the process line. For example, like the PLC 10c of FIG. 1, the PLC 10 may be installed for controlling open/close of an automatic door while interlocking with an entry/exit operation of the logistics robot 20 between process A and process B. Further, in the case of a building-type factory, the PLC 10 may also be installed for controlling an operation of an elevator for the movement of the logistics robot 20 between floors.

As the logistics robot 20, at least one of an autonomous mobile robot (AMR) and an automated guided vehicle (AGV) may be applied according to a design method of the production line.

In general, the AMR adopts the method that moves to a destination by autonomous driving while detecting the surrounding areas through a sensor, and the AGV adopts the method that moves through magnetic guidance, which is the difference from the AMR. However, the AMR and the AGV according to the exemplary embodiment of the present disclosure commonly include a communication module 21 and a driving module 22. Accordingly, in the following description, the present disclosure will be described on an assumption that the AMR is applied to the logistics robot 20.

The communication module 21 is connected with the server 30 through wireless communication to receive a transport path according to work allocation. For example, referring to FIG. 1, when it is assumed that the AMR 20 located in a component warehouse N12 loads the component and moves to process A N41 via the plurality of nodes, the transport path is set in an order of N12-N22-N32-N31-N41 according to a node ID.

The transport path includes a plurality of nodes that the AMR 20 needs to sequentially travel from a departure point, one or more stopovers, to a destination, and a link section connected in a travelling direction exists between the nodes.

The communication module 21 may measure a movement position of the communication module 21 and transmits the measured movement position to the server 30, and transceiver state information for interworking with the PLC 10 existing in the current traveling section. The movement position may be measured by a simultaneous localization and mapping (SLAM) method, a node/section-based tag ID recognition method, an interior position tracing method using a communication facility, such as a repeater, and the like. The state information may include whether the component is loaded, the operation state, and moving information to a next section.

The driving module 22 stores a factory map MAP and a coordinate system for each set node, and controls the movement of the AMR 20 based on the transport path. The driving module 22 may control operations of starting, stopping, rotating, moving backward, and going straight through the publicly known moving means of the AMR 20.

Further, the driving module 22 may control lift up/lift down for towing/towing release of a trolley on which the component is loaded at the departure point and the destination.

The driving module 22 recognizes the movement position of the AMR 20 and the state information of the PLC 10 existing in the travelling section, and performs the interlock control with the interworking operation according to a condition satisfaction of the set logic.

The AMR 20 may be configured in various types, such as a trolley towing method, a forklift method, a mini-rod method, and a front hook towing method, according to specifications.

The server 30 is a computing system for controlling the operation state of the PLC 10 and the AMR 20 at the center, and includes hardware and software for the control.

The server 30 controls the smooth operation of the process equipment interworked according to the position of the logistics robot transporting the component in the industrial site through the PLC 10.

For example, the server 30 includes a PLC communication unit 31, a logistics robot communication unit 32, a controller 33, a control history tracing unit 34, a control state display unit 35, and a database 36.

The PLC communication unit 31 is connected with the equipment control module 11 of the PLC 10 in order to control the operation of the equipment for each process and check the state information of the control.

The PLC communication unit 31 requests PLC memory data from the equipment control module 11 of the PLC 10 and receives the PLC memory data. The PLC memory data includes a PLC control condition set for interworking with the AMR 20, and an output value (hereinafter, referred to as "the PLC memory value) of a PLC memory address set for the control of each equipment.

Particularly, the PLC communication unit 31 may collect the PLC memory value output from the PLC memory address corresponding to each equipment connected to the PLC 10 of the process in order to check the state information. The PLC memory value collection function is utilized for tracing the control history of the PLC 10 which is to be described below.

The PLC communication unit 31 may include communication hardware (e.g., a processor, an antenna, and/or a circuit) and software stored in a memory or storage thereof, and may be configured to perform the respective operations when the hardware executes the software.

The logistics robot communication unit 32 establishes wireless communication with the AMR 20 to transmit the component transport path and collect a real-time movement position.

The logistics robot communication unit 32 may transmit the transport path initially generated according to the introduction or the change of the component transport work and an AMR operating condition for interworking with the PLC 10 for each node.

The logistics robot communication unit 32 may include communication hardware (e.g., a processor, an antenna, and/or a circuit) and software stored in a memory or storage thereof, and may be configured to perform the respective operations when the hardware executes the software.

The controller 33 is a central processing device controlling the general operation for operating the PLC for each movement position of the AMR 20 according to the exemplary embodiment of the present disclosure.

The controller 33 operates the AMR 20 transporting the component and controls the operation of the equipment connected to the PLC based on the movement position.

The controller 33 inputs an equipment control condition of the PLC 10 newly set according to the operation plan of the AMR 20 when new process work is introduced or the existing process work is changed, and a PLC memory value of the newly set equipment control condition to interwork with each other.

When the new process work is introduced or the existing process work is changed, the controller 33 generates a transport path of the AMR 20 for transporting the component for each process. The transport path may be set based on a coordinate for each node to which the AMR 20 is transportable in consideration of the position for each process line based on the coordinate system of the factory map MAP and a size of the component. The transport path may include a transport path through which the component is supplied from the component warehouse to a specific process, and a recovery path through which the AMR is returns.

The controller 33 designates a PLC memory value of the PLC memory address connected with the equipment of the PLC 10 within the process in which the control condition is satisfied based on the real-time movement position of the AMR 20 and controls the operation of the corresponding equipment.

In this case, the controller 33 checks state information of the equipment connected with the PLC 10 through the PLC communication unit 31, and sets a PLC memory value for interworking with the equipment for each movement position of the AMR 20. Further, the controller 33 may transmit the PLC memory value of the PLC 10 and request the input of the PLC memory value to the PLC memory address of the corresponding equipment.

After the control history tracing unit 34 controls the operation of the equipment through the input of the PLC memory value, the control history tracing unit 34 traces a control history, and recognizes whether the equipment is actually normally operated, and whether the input of the PLC memory value is omitted.

For example, the control history tracing unit 34 may trace the control history of the PLC through a control history tracing screen of FIG. 4.

The control history tracing unit 34 may include hardware (e.g., a processor and/or a circuit) and software stored in a memory or storage thereof, and may be configured to perform the respective operations when the hardware executes the software.

FIG. 4 is a diagram illustrating an example of the PLC control history tracing screen of the control history tracing unit according to the exemplary embodiment of the present disclosure.

Referring to FIG. 4, the control history tracing screen according to the exemplary embodiment of the present disclosure includes a result request table to request whether the PLC memory value set for the equipment connected to the PLC for each process is normally output, and a trace completion table in which whether the PLC memory value is output is received according to the request.

The trace completion table includes a current movement position 341 of the AMR, a memory address 342 of the equipment designated as a tracing target, a PLC memory value 343 output as a history of the control, a result 344 in which the PLC memory value output of the current condition is checked, a value 345 indicating whether the change is finally completed, a PLC control starting time 346, and a PLC control completion time 347.

The control history tracing unit 34 collects the control history of the equipment connected to the PLC 10 through the request through the PLC communication unit 31. In this case, the control history tracing unit 34 may designate equipment desired to be collected and collect the control history stored in the corresponding PLC memory address.

The control history tracing unit 34 may tract a real-time control history actually controlled according to the control of the operation of each equipment from the PLC 10 for each movement position of the AMR 20, make the traced control history in the form of a database, and manage the traced control history.

The control state display unit 35 displays a memory output value non-reflected error for a PLC memory value item that is not properly input according to the input request of the PLC memory value based on the control history data.

For example, the controller 33 of the server 30 performs interlock control by inputting a PLC memory value that temporally interrupts the operation of the equipment through the PLC 10 in order to prevent interference/collision when the AMR 20 enters the process section for each movement position. Further, opposite to the above, the controller 33 may perform the interlock control that interrupts the movement of the AMR 20 until the operation of the equipment is terminated.

The control state display unit 35 provides the PLC interlock control result for each process based on the control history data traced after the performance of the interlock control so that the operator is capable of recognizing the PLC interlock control result for each process.

FIG. 5 is a diagram illustrating a screen displaying a PLC interlock control state for each process according to the exemplary embodiment of the present disclosure.

Referring to FIG. 5, FIG. 5 illustrates an example in which the interlock control history performed in the PLC 10 for each process after the server 30 requests the input of the memory output value for the interlock control is displayed on the interlock table.

In this case, the control state display unit 35 may make an alarm by displaying an item in which the interlock operation is normally completed, and an item in which the interlock operation is failed due to the omission of the output of the PLC memory value to the operator.

The database 36 stores various program and data for operating the AMR 20 according to the exemplary embodiment of the present disclosure, and stores data collected and generated according to the operation.

In the server 30, the controller 33 may be implemented by one or more processors configured to execute the set program, and the set program may be programmed so that when the one or more processors executes the set program, the one or more processors may be configured to perform each operation of a method of operating the PLC for each movement position of the logistics robot according to the exemplary embodiment of the present disclosure. The program may be stored in a memory or a non-transitory computer readable medium in the controller 33 or in the server 30.

The method of operating the PLC for each movement position of the logistics robot will be described in more detail with reference to the following drawings.

Figure 6:
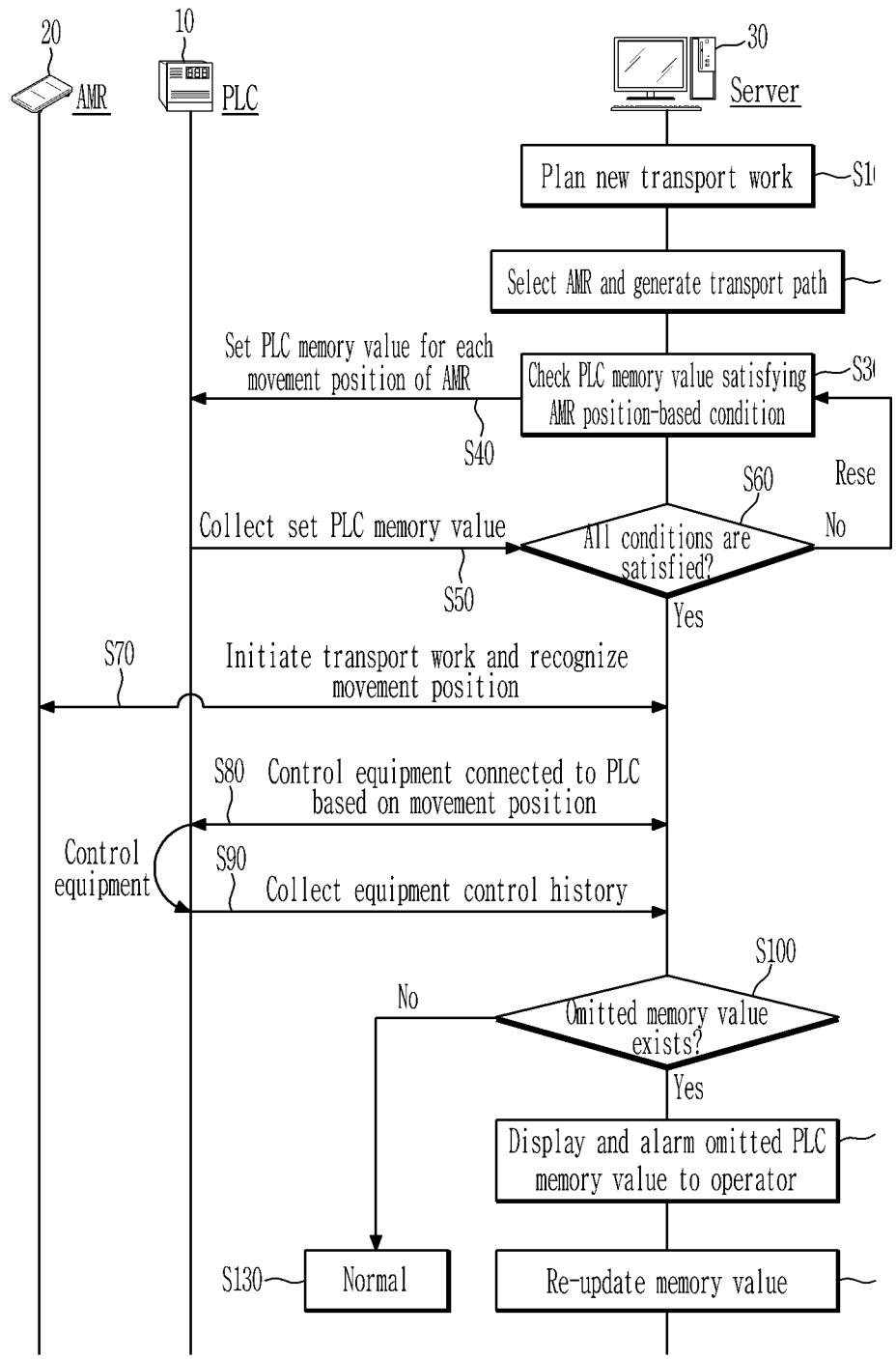
FIG. 6 is a flowchart schematically illustrating the PLC operating method for each movement position of the logistics robot according to the exemplary embodiment of the present disclosure.

FIG. 6 is a flowchart schematically illustrating the PLC operating method for each movement position of the logistics robot according to the exemplary embodiment of the present disclosure.

Figure 7:
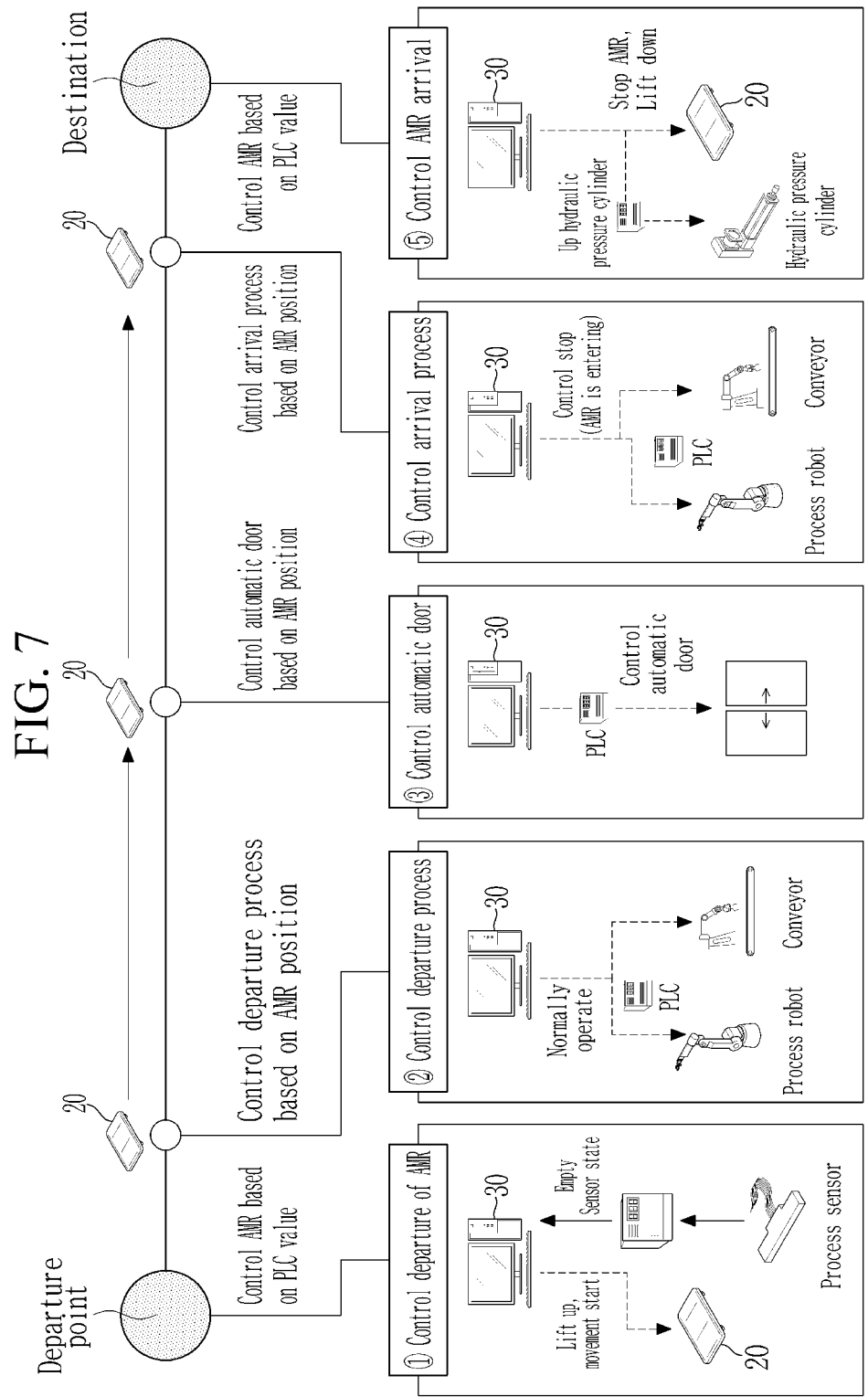
FIG. 7 is a diagram illustrating a PLC control process for each process according to a transport path of the logistics robot according to the exemplary embodiment of the present disclosure.

FIG. 7 is a diagram illustrating a PLC control process for each process according to a transport path of the logistics robot according to the exemplary embodiment of the present disclosure.

Referring to FIGS. 6 and 7, the method of operating the PLC for each movement position of the logistics robot according to the exemplary embodiment of the present disclosure will be described based on an assumption of a flow in which the server 30 interworks with the PLC 10 and the AMR 20.

The server 30 plans new transport work for operating the AMR 20 when the transport work is introduced according to the addition of a new process to the vehicle manufacturing factory (S10).

The server 30 selects the AMR 20 appropriate to the transport in consideration of the type and the size of the component required for the process, and generates a transport path from a departure point to a destination (S20). For example, the transport path may include node information from a component warehouse as a departure point to a destination process via an automatic door as illustrated in FIG. 7.

The server 30 checks a PLC memory value of the PLC 10 satisfying the control condition based on the transport path and the specification of the AMR 20 (S30), and transmits the PLC memory value according to the equipment control condition of the PLC 10 for each movement position of the AMR 20 to each PLC 10 and sets the PLC memory value (S40). The setting of the PLC memory value may be automatically set by a program, or manually set through the input of an operator. Further, the setting includes an interlock control condition for temporarily interrupting the AMR 20 or the equipment of the PLC 10 immediately before the entry to a specific node based on the movement position of the AMR 20.

The server 30 collects the PLC memory value set in the PLC 10 for each movement position of the AMR 20 after setting the PLC memory value (S50), and checks whether the PLCT memory value satisfies control condition (S60).

In hits case, when even any one among the set control conditions is not satisfied (NO in S60), the server 30 makes an alarm to the operator and resets the corresponding PLC memory value.

However, when all of the set interworking condition conditions are satisfied (YES in S60), the server 30 determines that according to the addition of the new process, the preparation for the transport work is completed in advance.

In the meantime, the method of operating the PLC for each movement position of the AMR 20 that actually transports the component like FIG. 6 after the completion of the preparation for the transport work will be continuously described.

The server 30 initiates the component transport work by allocating the transport path of the component to the AMR 20 and recognizes a real-time movement position from the AMR 20 (S70).

The server 30 controls the interworking operation of at least one equipment connected to the PLC 10 by inputting the PLC memory value to the PLC 10 in the entry section based on the movement position of the AMR 20 (S80), and traces a control history of each equipment and collects the PLC memory value output from the corresponding PLC memory address (S90). In this case, the server 30 may perform the interlock control for temporarily interrupting the operating equipment for safety immediately before the entry of the AMR 20.

Further, the PLC 10 controls the operation of each equipment according to the input PLC memory value, and then collects state information according to a result of the control and stores the collected state information in the PLC memory. Then, the PLC 10 may extract the control history of each equipment stored in the PLC memory according to the request of the server 30 and transmit the extracted control history to the server 30.

The server 30 recognizes whether there is a memory output value that is not controlled according to the request for the control of the PLC memory value based on the control history collected from the PLC 10 and is omitted (S100).

When the server 30 checks the collected control history and there is the memory output value omitted for the input of the set PLC memory value (YES in S100), the server 30 may display and alarm the omitted PLC memory value to the operator (S110).

In this case, the server 30 may automatically re-update the PLC memory value by transmitting the PLC memory value of the item omitted in the control history to the corresponding PLC 10, and manually re-update through an input of the operator as necessary (120).

However, when the server 30 checks the collected control history and there is no PLC memory value of the item omitted for the input of the set PLC memory value (NO in S100), the server 30 determines that at the component transport work is normally performed (S130).

Referring to FIG. 7, the method of operating the PLC for each movement position of the logistics robot 20 may be performed in the process of, based on the movement position of the AMR 20, ① an AMR departure control operation, ② a departure process control operation, ③ an automatic door control operation, ④ an arrival process control operation, and ⑤ an AMR arrival control operation.

As described above, according to the exemplary embodiment of the present disclosure, there is an effect of preventing in advance the risk factors that may occur depending on the operation of the actual logistics robot by checking in advance, by the server, whether the PLC control conditions are satisfied in order to control the smooth operation of the peripheral interlocking equipment according to the position of the logistics robot transporting the component.

Further, there is an effect in that it is possible to rapidly change the interruption event of the AMR and the update of the PLC memory value of the reason of the interruption event by integrally controlling the equipment connected to the PLC according to the movement position of the logistics robot and recognizing whether the equipment is operated and the position of the logistics robot according to the trace of the control history of each PLC in real time.

Further, there is an effect in that it is possible to manage and analyze the operation state for each process line at the center by monitoring, by the server, the plurality of logistics robots operated in the industrial site and the operation state of the automated equipment in real time through the PLC.

The exemplary embodiments of the present disclosure are not implemented only through the device and/or method described above, and may also be implemented through a program for realizing a function corresponding to the configuration of the exemplary embodiments of the present disclosure, a recording medium in which the program is recorded, and the like, and the implementation can be easily implemented by those skilled in the art from the description of the foregoing exemplary embodiment.

Although an exemplary embodiment of the present disclosure has been described in detail, the scope of the present disclosure is not limited by the embodiment. Various changes and modifications using the basic concept of the present disclosure defined in the accompanying claims by those skilled in the art shall be construed to belong to the scope of the present disclosure.

What is claimed is:

1. A system for operating a Programmable Logic Controller (PLC) for each movement position of a logistics robot, the system comprising:
 a logistics robot configured to supply a necessary component for each process at an industrial site;
 a PLC which is installed in each process and controls one or more connected equipment; and
 a server which allocates a transport path of a component to the logistics robot, controls an interworking operation of the equipment based on a movement position of the logistics robot through an input of a PLC memory value of the PLC, traces a control history of each equipment, and recognizes whether the equipment is normally operated and the input of the PLC memory value is omitted,
wherein:
the server includes:
 a PLC communication unit which is connected with the PLC and controls an operation of the equipment for each process and collects state information of the controlled equipment;
 a logistic robot communication unit which establishes wireless communication with the logistics robot, and transmits a transport path of the component to the logistics robot and collects a real-time movement position of the logistics robot;
 a controller which designates a PLC memory value of a PLC memory address connected with equipment of the PLC within a process in which a control condition is satisfied based on a real-time movement position of the logistics robot and controls an operation of the corresponding equipment;
 a control history tracing unit which traces a history of real-time control actually controlled according to the control of the operation of the equipment and manages the traced control history in a database; and
 a control state display which displays a memory output value non-reflection error for a PLC memory value item that is not properly input according to a request for an input of the PLC memory value based on the control history.

2. The system of claim 1, wherein:
the logistics robot includes at least one of an autonomous mobile robot (AMR) and an automated guided vehicle (AGV).

3. The system of claim 1, wherein:
the logistics robot includes:
 a communication module which measures a current movement position and transmits the measured current movement position to the server, and transceives state information for interworking with a PLC existing in a current travelling section; and
 a driving module which stores a factory map and a coordinate system for each set node, and controls a movement of the logistics robot based on the transport path.

4. The system of claim 1, wherein:
the PLC includes an equipment control module which recognizes an operation state of the equipment and a movement position and state information of the logistics robot, and controls the interworking operation of the equipment satisfying a control condition set in the PLC memory.

5. The system of claim 4, wherein:
the equipment control module performs interlock control that temporarily interlocks operating equipment for safety when the logistics robot enters.

6. A method of operating, by a server in an industrial site, a programmable logic controller (PLC) for each movement position of a logistics robot that transports component for each process, the method comprising:
 a) initiating component transport work by allocating a transport path of a component to a logistics robot and recognizing a real-time movement position of the logistics robot from the logistics robot;
 b) controlling an interworking operation of at least one equipment connected to the PLC by inputting a PLC memory value to the PLC of an entry section based on the movement position of the logistics robot;
 c) tracing a control history of each equipment and collecting the PLC memory value output from a corresponding PLC memory address; and
 d) recognizing whether there is a memory output value that is not controlled according to a request for control of the PLC memory value and is omitted based on the collected control history.

7. The system of claim 1, wherein:
the PLC communication unit collects a PLC memory value output from a PLC memory address of each equipment connected to the PLC in order to check the state information.

8. The system of claim 1, wherein:
the controller checks state information of equipment connected with the PLC through the PLC communication unit, and sets a PLC memory value for interworking with equipment for each movement position of the logistics robot.

9. The system of claim 8, wherein:
the controller transmits the PLC memory value to the PLC and requests the input of the PLC memory value to the PLC memory address of the corresponding equipment.

10. The system of claim 1, wherein:
the control history tracing unit traces the control history through a control history tracing screen including a result request table which requests whether the PLC memory value set for the equipment connected to the PLC for each process is normally output and a trace completion table in which whether the PLC memory value is output is received in correspondence to the result request table.

11. The system of claim 10, wherein:
the trace completion table includes a current movement position of the logistics robot, a memory address of equipment designated as a tracing target and a PLC memory value output as a control history, a result value according to checking of an output of a PLC memory value output of a current condition, a final change completion value, a PLC control start time, and a PLC control completion time.

12. The method of claim 6, further comprising:
before the operation a)
 selecting a logistics robot in consideration of the type and a size of a component when component transport work is planned, and generating a transport path from a departure point to a destination,
 checking the PLC and the PLC memory value according to a control condition based on the transport path and a specification of the logistics robot, and transmitting the PLC memory value according to an equipment control condition of the PLC for each movement position of the logistics robot to each PLC and setting the PLC memory value; and collecting the PLC memory value set in the PLC for each movement position after the PLC memory value is set and checking whether the PLC memory value satisfies the control condition.

13. The method of claim 6, wherein:

the operation b) includes performing interlock control for temporarily interrupting operating equipment for safety immediately before entry of the logistics robot.

14. The method of claim 6, wherein:

the operation c) includes:

controlling, by the PLC, an operation of each equipment according to the input PLC memory value, collecting state information according to a result of the control, and storing the collected state information in a PLC memory; and extracting and transmitting the control history of each equipment stored in the PLC memory according to a request from the server.

15. The method of claim 6, wherein:

the operation d) includes when there is an omitted memory output value for an input of the PLC memory value, displaying and alarming the omitted PLC memory value.

16. The method of claim 6, further comprising:

after the operation d), transmitting the PLC memory value of an item omitted in the control history to a corresponding PLC and re-updating the PLC memory value.

17. The method of claim 12, wherein:

the checking includes, when even any one among the set control conditions is not satisfied, outputting an alarm and resetting the corresponding PLC memory value.

* * * * *